US011870886B2

(12) United States Patent
Vald et al.

(10) Patent No.: US 11,870,886 B2
(45) Date of Patent: Jan. 9, 2024

(54) SYSTEM AND METHOD FOR MULTITENANT KEY DERIVATION

(71) Applicant: INTUIT INC., Mountain View, CA (US)

(72) Inventors: Margarita Vald, Tel Aviv (IL); Olla Nasirov, Tel Aviv (IL); Gleb Keselman, Tel Aviv (IL); Yaron Sheffer, Tel Aviv (IL); Sergey Banshats, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/301,886

(22) Filed: Apr. 17, 2023

(65) Prior Publication Data

US 2023/0261855 A1 Aug. 17, 2023

Related U.S. Application Data

(63) Continuation of application No. 16/991,218, filed on Aug. 12, 2020, now Pat. No. 11,646,871.

(51) Int. Cl.
*H04L 9/08* (2006.01)
*H04L 9/32* (2006.01)

(52) U.S. Cl.
CPC .......... *H04L 9/0822* (2013.01); *H04L 9/083* (2013.01); *H04L 9/0861* (2013.01); *H04L 9/0891* (2013.01); *H04L 9/3247* (2013.01); *H04L 2209/04* (2013.01)

(58) Field of Classification Search
CPC ..... H04L 9/0822; H04L 9/083; H04L 9/0861; H04L 9/0891; H04L 9/3247; H04L 2209/04
See application file for complete search history.

(56) References Cited

U.S. PATENT DOCUMENTS

| 6,230,269 | B1 * | 5/2001 | Spies | H04L 9/302 380/282 |
| 8,850,227 | B1 * | 9/2014 | Krahn | G06F 21/57 713/189 |
| 8,892,865 | B1 * | 11/2014 | Roth | H04L 63/064 713/184 |
| 10,044,503 | B1 * | 8/2018 | Roth | H04L 9/14 |
| 11,121,869 | B1 * | 9/2021 | Crahen | H04L 9/3242 |
| 2003/0174842 | A1 * | 9/2003 | Challener | H04L 63/061 380/277 |
| 2005/0005097 | A1 * | 1/2005 | Murakawa | H04L 63/0823 713/156 |
| 2005/0097332 | A1 * | 5/2005 | Imai | G06F 21/33 713/176 |
| 2007/0174906 | A1 * | 7/2007 | Burchett | G06F 21/31 726/8 |

(Continued)

Primary Examiner — J. Brant Murphy
(74) Attorney, Agent, or Firm — DLA PIPER LLP (US)

(57) ABSTRACT

Systems and methods that may be used to provide multi-tenant key derivation and management using a unique protocol in which key derivation may be executed between the server that holds the root key and a client that holds the derivation data and obtains an encryption key. In one or more embodiments, the derivation data may be hashed. The disclosed protocol ensures that the server does not get access to or learn anything about the client's derived key, while the client does not get access to or learn anything about the server's root key.

20 Claims, 5 Drawing Sheets

(56) References Cited

U.S. PATENT DOCUMENTS

| | | | |
|---|---|---|---|
| 2010/0100724 A1* | 4/2010 | Kaliski, Jr. | H04L 9/3226 |
| | | | 713/171 |
| 2019/0207769 A1* | 7/2019 | Donohoe | G06F 21/602 |
| 2019/0340393 A1* | 11/2019 | Mo | G06F 21/554 |
| 2019/0394031 A1* | 12/2019 | Deng | H04L 9/0861 |
| 2020/0067699 A1* | 2/2020 | Resch | G09C 1/00 |
| 2020/0244451 A1* | 7/2020 | Herder, III | H04L 9/3231 |
| 2020/0314647 A1* | 10/2020 | Wang | H04L 63/0823 |
| 2021/0377010 A1* | 12/2021 | Kong | H04L 63/06 |

* cited by examiner

SYSTEM AND METHOD FOR MULTITENANT KEY DERIVATION

CROSS REFERENCE TO RELATED APPLICATIONS

This application is a Continuation application of U.S. application Ser. No. 16/991,218 filed Aug. 12, 2020. The entirety of the above-listed application is incorporated herein by reference.

BACKGROUND

Many computer applications require cryptographic operations for multiple clients, users, or processes. For example, multiple clients may require separate keys for accessing applications hosted by servers or cloud-based systems through one or more networks. To enhance security in case of a breach, server/cloud side key management systems may be separated. For example, if an attacker breaches one key server, they may only gain a small number of the total keys, and may have to breach additional servers separately to gain more keys.

Due to their complexity, currently existing key management services require separate groups of servers per project and therefore introduce tremendous overall costs due to the additional hardware and overhead. These services also require large storage resources to store the numerous keys being managed and used for encryption and decryption purposes, and the storage of encrypted data. Moreover, these services also utilize complex exponential processing during key generation and derivation processing, meaning that they are also processor intensive. As can be appreciated, all of these results are undesirable.

Accordingly, there is a need and desire for a new and improved multitenant key derivation process that overcomes the shortcomings of today's key management services.

DETAILED DESCRIPTION OF SEVERAL EMBODIMENTS

Figure 1:
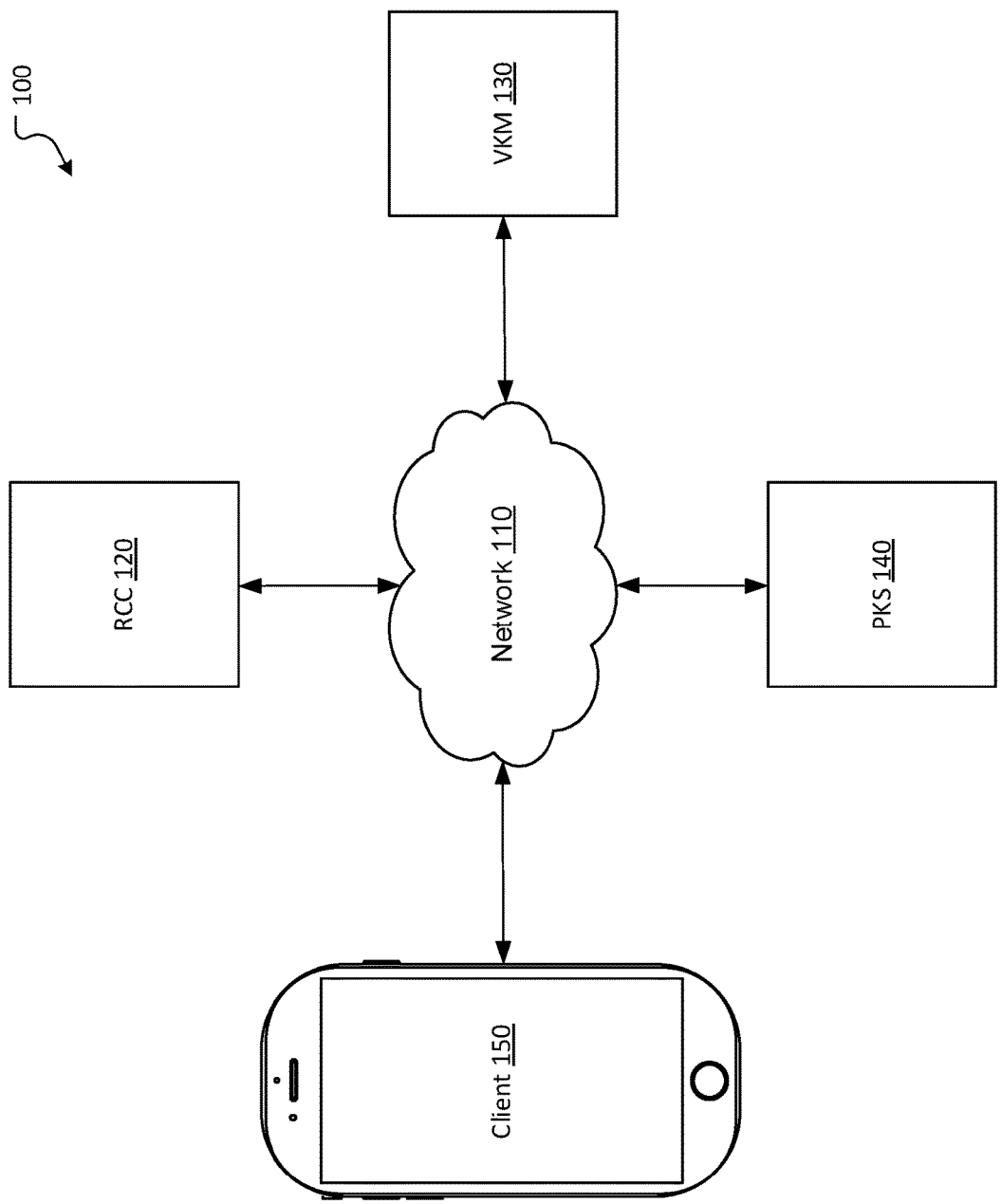
FIG. 1 shows an example system configured to perform multitenant key derivation according to an embodiment of the present disclosure.

Some embodiments described herein may enable multitenant key derivation and management using a unique protocol in which (remote) key derivation may be executed between the server that holds the root key and a client that holds the derivation data and obtains an encryption key. In one or more embodiments, the derivation data may be hashed and may include some information, potentially secret, associated with the data to be encrypted. The use of the hashed data and processing disclosed herein provides the advantage of simplifying the computations used throughout the process such as e.g., by removing complex derivation computations that utilize exponents and exponential processing. Instead, the principles disclosed herein are based on simplified multiplication operations rather than complex exponential processing, reducing the load on the processors when carrying out the disclosed protocol. In addition, the hashed data and processing disclosed herein allow for the use of very short headers when encrypted data (e.g., ciphertext) is stored. Thus, the principles disclosed herein require significantly less storage resources to store the keys being managed and used for encryption and decryption purposes.

Moreover, the disclosed protocol ensures that the server does not get access to or learn anything about the client's derived key, while the client does not get access to or learn anything about the server's root key. Significantly, the server cannot force the derived key to a value of its choice. These features allow the protocol to run simultaneous mutually distrustful key derivation processes on the same cluster of machines, thereby reducing the number of servers needed when keys for multiple projects are being derived and or managed.

In one or more embodiments, the protocol may be executed between a client computing device and one or more server computing devices in communication with the client computing device. In one or more embodiments, the protocol may have the following high level structure: (1) the client computing device may provide blinded and or hashed derivation data, while the one or more server computing devices (2) may provide an encrypted key, and (3) may compute a derived key based on the root key and the derivation data. In one or more embodiments, the derived key may be blinded when on the one or more server computing devices, meaning that the one or more server computing devices will not have access to the cleartext derived key, and can only be unblinded (revealed) by the client.

In one or more embodiments, the one or more server computing devices implement a remote crypto cluster (RCC), virtual key manager (VKM) and a project key server (PKS). In one or more embodiments, the protocol may have the following high level structure: (1) the client computing device may provide blinded and or hashed derivation data, (2) the VKM may provide an encrypted key, and (3) the RCC may compute a derived key based on the root key and the derivation data. In one or more embodiments, the derived key may be blinded when on the RCC, meaning that the RCC will not have access to the cleartext derived key, and can only be unblinded (revealed) by the client.

Figure 2:
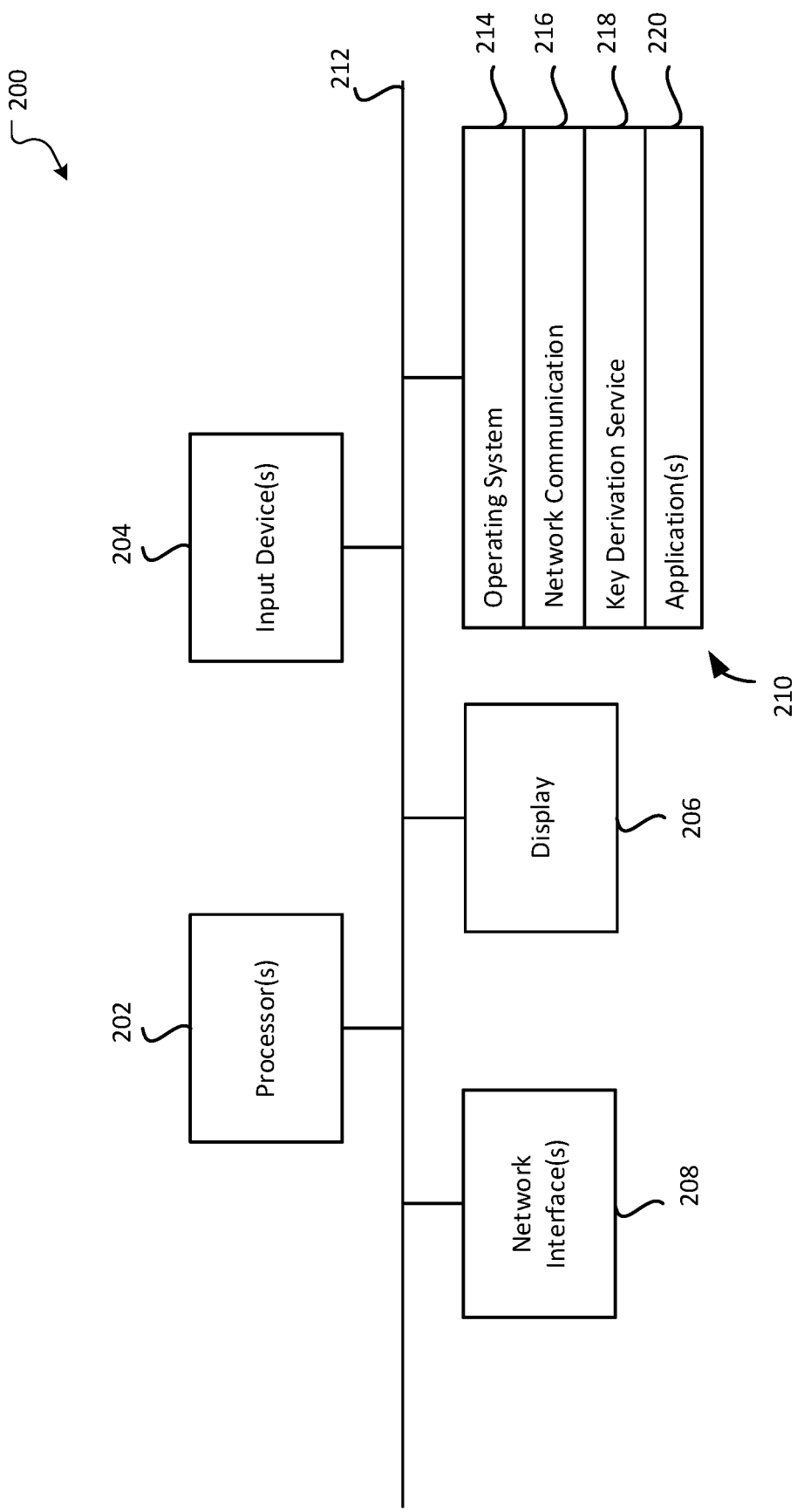
FIG. 2 shows an example computing device according to an embodiment of the present disclosure.

FIG. 1 shows an example system 100 configured to perform multitenant key derivation according to an embodiment of the present disclosure. In the illustrated example, the system 100 includes elements such as a remote crypto cluster (RCC) 120, virtual key manager (VKM) 130, project key server (PKS) 140, and/or at least one client 150. Each of these elements may include one or more physical computing devices (e.g., which may be configured as shown in FIG. 2). In one or more embodiments, the RCC 120 may be merged into the VKM 130. In some embodiments, the client 150 may be any device configured to provide access to remote applications. For example, the client 150 may be a smartphone, personal computer, tablet, laptop computer, or other device. It should be appreciated that the disclosed principles should not be limited to the illustrated example and that they can be applied to one or more server computing devices that are separate from a client computing device.

The elements may communicate with one another through at least one network 110. Network 110 may be the Internet and/or other public or private networks or combinations thereof. For example, in some embodiments, at least the RCC 120, VKM 130, and PKS 140 may communicate with one another over secure channels (e.g., one or more TLS/SSL channels). In some embodiments, communication between at least some of the elements of the system 100 may be facilitated by one or more application programming interfaces (APIs). APIs of the system 100 may be proprietary and/or may be examples available to those of ordinary skill in the art such as Amazon© Web Services (AWS) APIs or the like.

Specific examples of the processing performed by the elements of the system 100 in combination with one another are given below with respect to the multitenant key derivation process 300 illustrated in FIG. 3, the multitenant key derivation protocol 400 illustrated in FIG. 4, and or the project key rotation protocol 310 illustrated in FIG. 5.

The RCC 120, VKM 130, PKS 140, and client 150 are each depicted as single devices for ease of illustration, but those of ordinary skill in the art will appreciate that the RCC 120, VKM 130, PKS 140, and/or client 150 may be embodied in different forms for different implementations. For example, the RCC 120 may be merged into the VKM 130 and they may reside on one or more computing devices. In other embodiments, the RCC 120, VKM 130, and/or PKS 140 may include a plurality of devices. In another example, a plurality of clients 150 may be connected to the network 110 and may use the key derivation services described herein. Furthermore, as noted above, the network 110 may be a single network or a combination of networks, which may or may not all use similar communication protocols and/or techniques.

FIG. 2 is a block diagram of an example computing device 200 that may implement various features and processes as described herein. For example, in some embodiments the computing device 200 may function as the RCC 120, VKM 130, PKS 140, or client 150, or a portion of any of these elements. The computing device 200 may be implemented on any electronic device that runs software applications derived from instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by a bus 212.

The display device 206 may be any known display technology, including but not limited to display devices using Liquid Crystal Display (LCD) or Light Emitting Diode (LED) technology. The processor(s) 202 may use any known processor technology, including but not limited to graphics processors and multi-core processors. The input device 204 may be any known input device technology, including but not limited to a keyboard (including a virtual keyboard), mouse, track ball, and touch-sensitive pad or display. The bus 212 may be any known internal or external bus technology, including but not limited to ISA, EISA, PCI, PCI Express, USB, Serial ATA or FireWire. The computer-readable medium 210 may be any non-transitory medium that participates in providing instructions to the processor(s) 202 for execution, including without limitation, non-volatile storage media (e.g., optical disks, magnetic disks, flash drives, etc.), or volatile media (e.g., SDRAM, ROM, etc.).

The computer-readable medium 210 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from the input device 204; sending output to the display device 206; keeping track of files and directories on the computer-readable medium 210; controlling peripheral devices (e.g., disk drives, printers, etc.) which can be controlled directly or through an I/O controller; and managing traffic on the bus 212. The network communications instructions 216 may establish and maintain network connections (e.g., software for implementing communication protocols, such as TCP/IP, HTTP, Ethernet, telephony, etc.).

The key derivation service instructions 218 may include instructions that perform the various multitenant key derivation functions as described herein. The key derivation service instructions 218 may vary depending on whether the computing device 200 is functioning as the RCC 120, VKM 130, PKS 140, or client 150. For example, the RCC 120 may include key derivation service instructions 218 for requesting data from other devices and using it to compute a blinded derived key. The client 150 may include key derivation service instructions 218 for generating public/private key pairs and using the private key to decrypt the blinded derived key. The VKM 130 and/or PKS 140 may include key derivation service instructions 218 for generating and/or transmitting data used throughout the process 300, protocol 400 and or required by other devices.

The application(s) 220 may be an application that uses or implements the processes described herein and/or other processes. The processes may also be implemented in the operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

The disclosed principles will be described as involving a project associated with n clients, that each use the key-derivation process disclosed herein to securely derive keys with at least the following properties: 1) the derived keys are pseudo-random; 2) every key can be derived by any client using appropriate derivation data; and 3) the derivation data is available to all clients associated with the project. Moreover, in one or more embodiments, any two clients may derive the same key given the same root key and same derivation data.

In accordance with the disclosed principles, the VKM 130, RCC 120 and PKS 150 may participate in the multitenant key derivation process 300 (FIG. 3) and multitenant key derivation protocol 400 (FIG. 4) with the client 150. In one or more embodiments, the VKM 130 may be in charge of managing the keys associated with the project, the RCC 120 may be in charge of participating in the key derivation process with the clients. In one or more embodiments, the RCC 120 is part of the VKM 130 and executed by it. In one or more embodiments, the PKS 140 may be in charge of managing the project key and client secret values required for the key-derivation process. In one or more embodiments, the communication channels are authenticated and private (e.g., authenticity and secrecy of the communications are obtained using SSL (Secure Sockets Layer), which is a secure protocol developed for sending information securely over the Internet).

Figure 3:
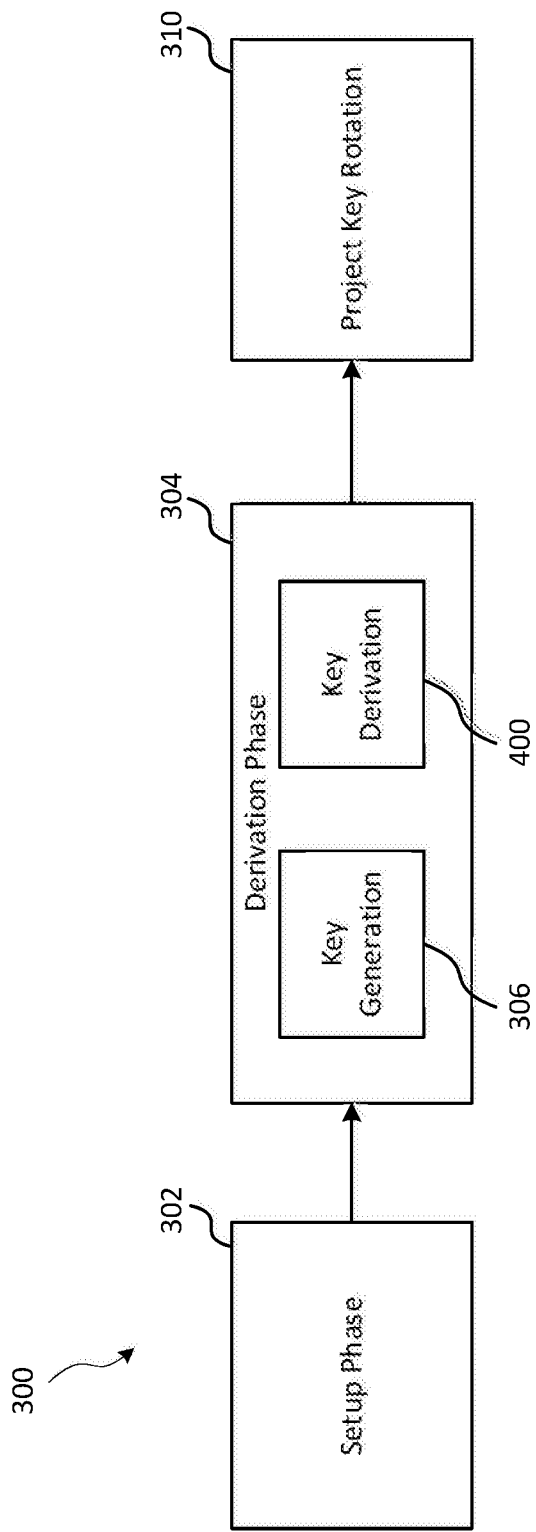
FIG. 3 shows an example multitenant key derivation process according to an embodiment of the present disclosure.

FIG. 3 shows an example multitenant key derivation process 300 according to an embodiment of the present disclosure. The process 300 may consist of two phases: a setup phase 302 and a derivation phase 304. In one or more embodiments, the process 300 may support a project key rotation protocol 310. In one or more embodiments, the setup phase 302 may be used generate one or more setup parameters or other values needed for the derivation phase 304 and or the project-key rotation protocol 310. The derivation phase 304 may consist of several subroutines that can be executed by the clients. In one or more embodiments, the project key rotation protocol 310 may be used to generate a fresh project key and (atomically) update the relevant database records. As such, the project key rotation protocol 310 may be characterized as a rekeying process.

Some portions of process 300 and other processes discussed herein are described as using specific equations. However, it will be clear to those of ordinary skill in the art that some portions of process 300 may be performed with modifications to the example equations and/or with different processing altogether. The following definitions may be useful for understanding the example equations presented herein:

n is the number of clients.

For $i \in [n]$, $C_i$ is the i'th client and $b_i$ is the blinding value associated with client $C_i$. A blinding value $b_i$ is added to and or processed with other data to form blinded data, which can only be unblinded using the blinding value $b_i$.

$\ell$ is the number of root keys in the project.

For $j \in [\ell]$, $z_j$, $v_j$, and $t_j$ are respectively the j'th RCC root key and additional variables used for derivation with $z_j$. The length of $z_j$, $v_j$, and $t_j$ is 2,048 bits.

DD is the derivation data supplied by the client.

(vsk, vpk) is the VKM's key pair for RSA encryption. These keys are generated once and vpk is known to all entities in the system.

(sk, vk) is the PKS' key pair for an RSA signature scheme. These keys are generated once and vk is known to all entities in the system.

p is a 2,048 bit prime number generated once and is known to all entities in the system.

K is the project key (i.e., master key) that is generated in $\mathbb{Z}_p$.

w is a project-wide client key that is shared among all clients and has a length of 2,048 bits.

pks-project-key-version is the latest project key version generated by the PKS.

vkm-project-key-version is the latest project key version received by VKM.

key-update-value is the ratio of the current project-key and previous project key.

All the definitions are presented as being within the scope of a "project," which may be a partitioning of the system 100 into multiple key namespaces and multiple clients associated with the namespaces, where (through cryptographic systems and/or methods) a client 150 may be prevented from using keys of a project unless the client 150 is associated with that project. The system 100 may be configured so that there may be simultaneous multiple projects, e.g., on the same RCC 120 and/or VKM 130, while preserving the guarantee that the client 150 may have access only to keys of projects with which the client 150 is associated.

In accordance with the disclosed principles, keys may be used to access projects, which may be any protected service or process. When a project is first created and/or registered with the system 100, the system 100 may perform the setup phase 302. In one or more embodiments, during the setup phase 302, the VKM 130 and PKS 140 may locally generate and set values of certain parameters that are required for, and may be fixed during, the whole life-cycle of the project. In one or more embodiments, rotation of certain secret values may be permitted to boost the security of the protocol 300.

In one or more embodiments, part of the setup phase 302 is performed by the VKM 130 in response to receiving a VKM setup message "message (VKM setup)" from a user U. In one or more embodiments, the user U is a system operator or other personnel responsible for setting up a project and or its key name space. During the setup phase 302, the VKM 130 may set vkm-project-key-version (i.e., the latest project key version received by VKM) to 1 and key-update-value (i.e., the ratio of the current project-key and previous project key) to 1. The VKM 130 may store the values of these parameters for later use in a protected keys record.

A second part of the setup phase 302 is performed by the PKS 140 in response to receiving a PKS setup message "message (PKS setup)" from the user U. During the setup phase 302, the PKS 140 will uniformly sample at random $w \leftarrow \{0, 1\}^{2048}$ and $K \leftarrow \mathbb{Z}_p$. The PKS 140 may set pks-project-key-version (i.e., the latest project key version generated by the PKS) to 1. The PKS 140 may store the values of these parameters for later use.

The derivation phase 304 may consist of a key generation process 306 and a key derivation protocol 400. The key generation process 306 may be performed by the VKM 130 in response to receiving a message "message (VKM Key-Gen, key-name)" from client $C_i$ asking the VKM to generate a key-name. During the key generation process 306, the VKM 130 may uniformly sample values at random for the following parameters: $\hat{z}_j \leftarrow \mathbb{Z}_p$, $v_j \leftarrow \{0, 1\}^{2048}$ and $t_j \leftarrow \{0, 1\}^{2048}$. In one or more embodiments, the VKM 130 may set $\hat{z}_j = z_j \cdot K$, and store the values of $z_j K$, $v_j$, $t_j$, and key-name. This is a protected key generation process performed locally at the VKM 130, which uniquely defines the value of the specific key (since the project key has been defined at this stage).

The key derivation protocol 400 can be performed locally on the client side or remotely involving the VKM 130 (and or RCC 120) as discussed below in more detail with respect to FIG. 4. In one or more embodiments, the key derivation protocol 400 will utilize keyed hash function ("HKDF") computations performed by the VKM 130 and the client 150. In one or more embodiments, the keyed hash function HKDF is computed on (key, value, output bit length) as described in more detail below. In accordance with the disclosed principles, the HKDF computations performed by the VKM 130 are used to prevent a dictionary attack on the derivation-data.

In the key rotation protocol 310, a fresh project key may be generated by the PKS 140 and the VKM 130 will update the protected keys record with the appropriate values. In one or more embodiments, the key database may be updated via an atomic update operation.

Figure 4:
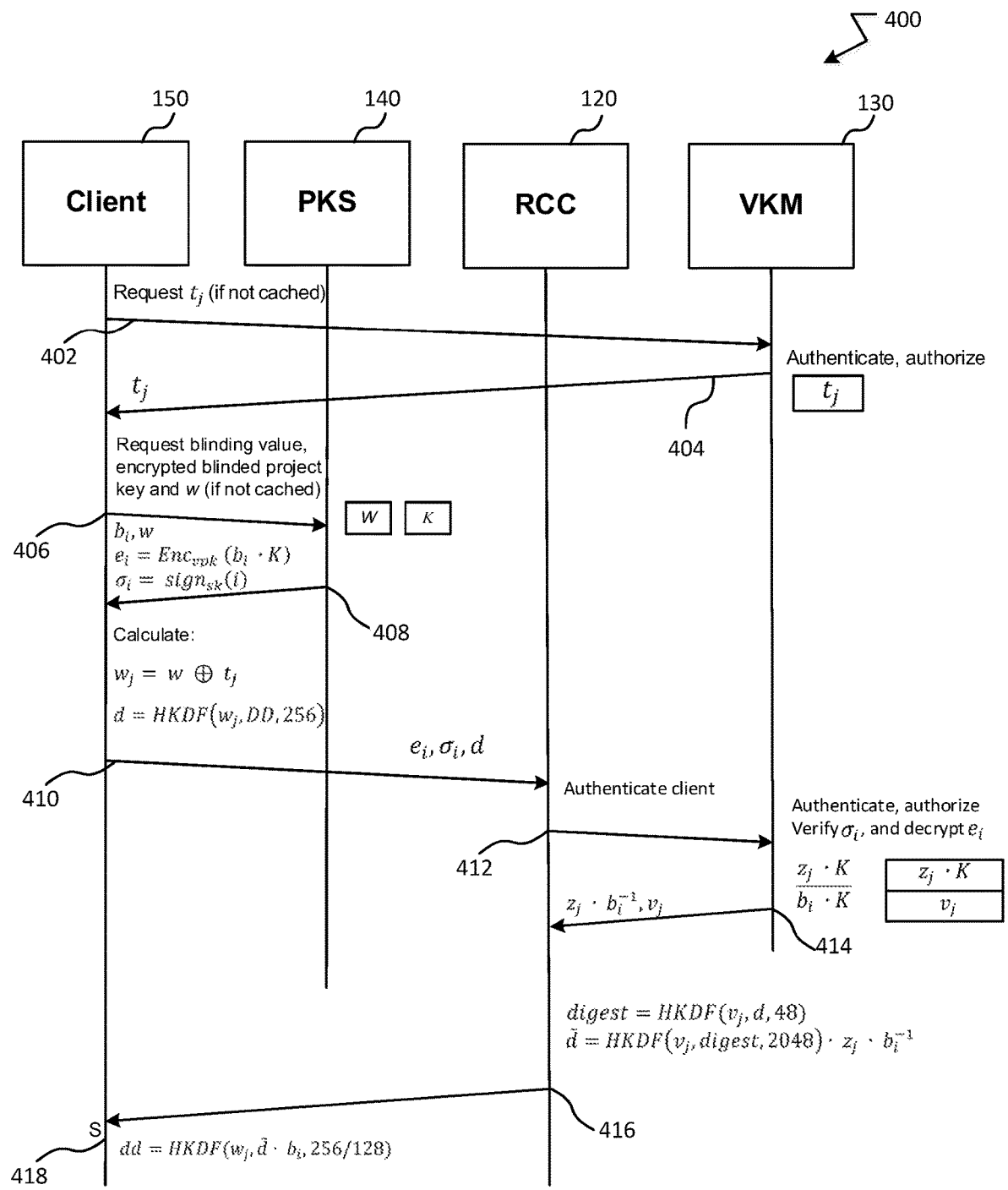
FIG. 4 shows an example multitenant key derivation protocol according to an embodiment of the present disclosure.
Figure 5:
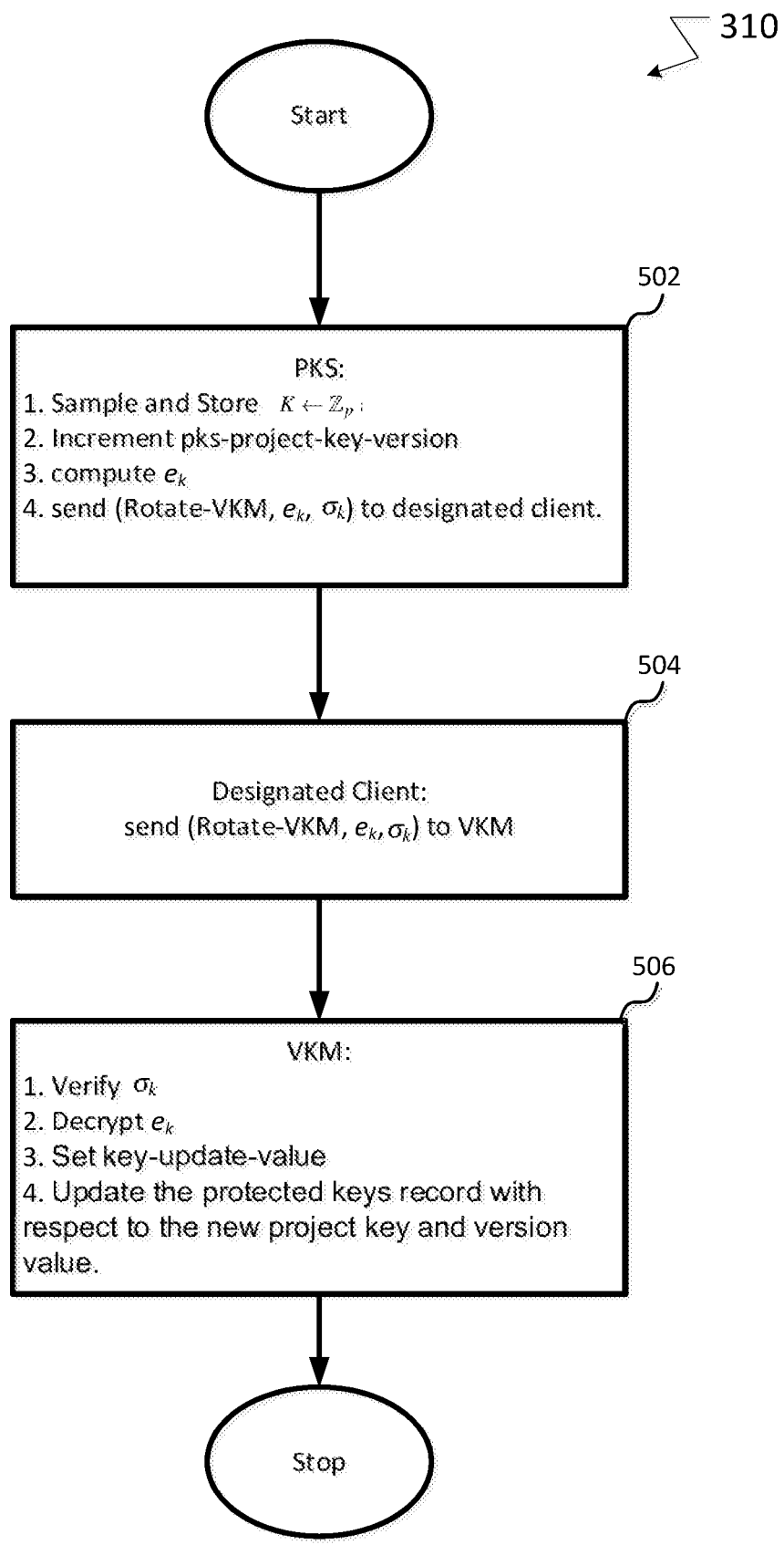
FIG. 5 shows an example key rotation protocol according to an embodiment of the present disclosure.

FIG. 4 illustrates an example multitenant key derivation protocol 400 according to an embodiment of the present disclosure. The entire system 100 may work together to perform protocol 400 in a distributed manner. In accordance with the disclosed principles, the client computing 150 may provide blinded and or hashed derivation data, the VKM 130 may provide an encrypted key, and the RCC 120 may compute a derived key based on the root key and the derivation data. In one or more embodiments, the derived key may be blinded when on the RCC, 120 meaning that the RCC 120 will not have access to the cleartext derived key, and can only be unblinded (revealed) by the client 150. This arrangement may yield a low-cost, multitenant system 100 with strong protection of stored and/or managed data. The protocol 400 is presented as deriving a single key for a single project or use, but it should be appreciated that the protocol 400 may be performed repeatedly to generate multiple keys in some embodiments, if desired.

At this point, because the setup phase 302 and key generation process 306 of the process 300 have already been performed, the VKM 130, PKS 140 and client 150 may have the following information, states and or conditions. The VKM 130 may have a stored protected keys record comprising the $z_j K$, $v_j$, $t_j$ and key-name parameters ("protected keys record ($z_j K$, $v_j$, $t_j$ and key-name)" and the parameters key-update-value, and vkm-project-key-version. The PKS 140 may comprise the project key K, client-key w, and the pks-project-key-version parameter. The client 150 may comprise the derivation data DD and a message m to be encrypted. The client's 150 cache storage may include the client-key w, key identifier $t_j$, client blinding value $b_i$, ciphertext $e_i$, and a signature $\sigma_i$ on the ciphertext $e_i$. In one or more embodiments, the ciphertext $e_i$ is based on an encryption of the tuple $b_i \cdot K$ and pks-project-key-version (i.e., $e_i = ENC_{vpk}(b_i \cdot K | pks\text{-}project\text{-}key\text{-}version)$). In one or more embodiments, RSA encryption and signatures are used throughout the protocol 400. In one or more embodiments, the RSA encryption and signatures use a bit length of 2048.

At step 402, the client 150 determines if the key identifier $t_j$ is stored within its cache. If the key identifier $t_j$ is not cached, the client 150 may request the VKM 130 to send $t_j$ via a message "message (params-VKM, key-name)" sent to the VKM 130. If the client 150 determines that its cache includes the appropriate parameters, it will not send the message (params-VKM, key-name) to the VKM 130 or the message (params-PKS) to the PKS 140 and the protocol 400 will continue at step 410.

At step 404, the VKM 130 receives and may authenticate the message (params-VKM, key-name). Once authenticated, the VKM 130 may send the key identifier $t_j$ to the client 150 (client $C_i$) in a message "message (RCC-Key-identifier, ti)".

At step 406, if some other cached values are not available at the client 150, the client 150 requests the necessary values by sending a parameters request message "message (params-PKS)" to the PKS 140. For example, the client 150 ($C_i$) may send the message "message (params-PKS)" to the PKS 140 to request parameters such as e.g., the blinding value $b_i$, encrypted blinded project key and client-key w (if not cached). If the client 150 determines that its cache includes the appropriate parameters, it will not send the message (params-PKS) to the PKS 140 and the protocol 400 will continue at step 410.

At step 408, upon receiving the message (params-PKS) from the client 150 ($C_i$), the PKS 140 generates the blinding value $b_i$ from $\mathbb{Z}_p$ (i.e., $b_i \leftarrow \mathbb{Z}_p$). The PKS 140 may also calculate $e_i$ as the encryption of the tuple $b_i \cdot K$ and pks-project-key-version (i.e., $e_i = ENC_{vpk}(b_i \cdot K | pks\text{-}project\text{-}key\text{-}version)$) and derive a signature $\sigma_i$ based on $e_i$ (i.e., $\sigma_i = sign_{sk}(e_i)$). In addition, the PKS 140 may send a message "message (Derive-Client-values, $b_i$, $e_i$, $\sigma_i$, w)" to the client 150 ($C_i$) requesting that the client 150 ($C_i$) derive values for parameters required for subsequent steps in the process 400. In doing so, the message (Derive-Client-values, $b_i$, $e_i$, $\sigma_i$, w) may send parameters $b_i$, $e_i$, $\sigma_i$, w to the client 150 ($C_i$).

At step 410, the client 150 ($C_i$) has the parameters $t_j$, $b_i$, $e_i$, $\sigma_i$, w, as discussed above, and may record the values of these parameters in its cache memory. As part of the protocol 400, the client 150 ($C_i$) may compute a derivation input such as e.g., a parameter d using a keyed hash function of the client-key w, key identifier $t_j$, and derivation data DD (i.e., d=HKDF(w ⊕ $t_j$, DD, 256). The client 150 ($C_i$) may send a message "message (Remote-derive-VKM, d, $e_i$, $\sigma_i$, key-name)" to the VKM 130 requesting that the VKM 130 derive values for parameters required for subsequent steps in the process 400. In doing so, message (Remote-derive-VKM, d, $e_i$, $\sigma_i$, key-name) may send parameters d, $e_i$, $\sigma_i$, key-name to the VKM 130.

In the illustrated embodiment, the client 150 ($C_i$) sending the message (Remote-derive-VKM, d, $e_i$, $\sigma_i$, key-name) is initially authenticated at the RCC 120 (at step 412) before the message is processed by the VKM 130. As noted above, the RCC 120 may be implemented as part of the VKM 130, meaning that this authentication step may be performed by the VKM 130. At step 412, upon receiving the message (Remote-derive-VKM, d, $e_i$, $\sigma_i$, key-name), the VKM 130 may verify the signature $\sigma_i$ with the PKS's 140 vk key in e.g., an RSA signature verification process. If the signature $\sigma_i$ is not verified, then the process 400 terminates.

If, however, the signature $\sigma_i$ is verified, the VKM 130 may decrypt $e_i$ with the VKM's 130 vsk key in e.g., an RSA decryption process to obtain the tuple $b_i$·K|pks-project-key-version. The VKM 130 may calculate the inverse of the $b_i$·K (i.e., $(b_i \cdot K)^{-1}$) and if it determines that the pks-project-key-version is equal to the vkm-project-key-version, it may compute $z_j b_i^{-1} = z_j K \cdot (b_i \cdot K)^{-1}$ where $z_j$ is the key associated with key-name. However, if the pks-project-key-version is not equal to the vkm-project-key-version, the decrypted $b_i$·K is multiplied by the key-update-value before computing $z_j b_i^{-1} = z_j K \cdot (b_i \cdot K)^{-1}$.

At step 416, the RCC 120 may compute the digest parameter as the keyed hash function of $v_j$ and d (i.e., digest=HKDF($v_j$, d, 48)). The RCC 120 may also compute a modified d parameter (i.e., $\bar{d}$) as the keyed hash function of $v_j$ and digest (i.e., $\bar{d}$=HKDF($v_j$, digest, 2048)·$z_j b_i^{-1}$). In addition, the RCC 120 may send a message "message (Remote-derive-Client, digest, $\bar{d}$)" to the client 150 ($C_i$) requesting that the client compute a derived key. The message (Remote-derive-Client, digest, d) may send the parameters digest and d to the client 150 ($C_i$). In the illustrated embodiment, the RCC 120 is shown as performing step 416, but it should be appreciated that this step may be performed by the VKM 130, particularly if the RCC 120 is merged into the VKM 130.

At step 418, after receiving the message (Remote-derive-Client, digest, $\bar{d}$), the client 150 ($C_i$) may compute the derived key dd as the has function of w ⊕ $t_j$ and $\bar{d} \cdot b_i$ (i.e., dd=HKDF((w ⊕ $t_j$, $\bar{d} \cdot b_i$, 256/128). In addition, the client 150 ($C_i$) may encrypt the message m using the derived key dd and store the digest and ciphertext.

According to the protocol 400, blinded and or hashed derivation data DD (e.g., from the client and only known by the client) and an encrypted key (e.g., from the VKM) may be used to compute a derived key (e.g., by the RCC or VKM) that is blinded when on the RCC (or VKM). This means that the computing device implementing the VKM and RCC does not get access to or learn anything about the client's derived key, while the client does not get access to or learn anything about the server's root key. As such, privacy is ensured throughout the encryption, storage and decryption of the message m.

As noted above, the disclosed process 300 may also allow for a project key rotation protocol 310 (FIG. 3). In one or more embodiments, a new project key may be randomly selected during the project key rotation protocol 310 (e.g., by the PKS 140) and is updated at the VKM 130 as discussed below. An example of the project key rotation protocol 310 is illustrated in FIG. 5.

In one or more embodiments, when the project key rotation protocol 310 is performed, the VKM 130 may contain a protected keys record comprising $z_j$·K and key-name, a key-update-value, and the vkm-project-key-version. In one or more embodiments, the PKS 140 may comprise the project key K and the pks-project-key-version.

In the illustrated protocol 310, the PKS 140 may perform step 502 after receiving a message "message (Rotate-PSK)" to rotate the project key. In one or more embodiments, the message (Rotate-PSK) may be received from a designated client 150. At step 502, the PKS 140 may uniformly sample at random a project key K from $\mathbb{Z}_p$ (i.e., K←$\mathbb{Z}_p$) and store the project key K. The PKS 140 may also increment the pks-project-key-version (i.e., pks-project-key-version=pks-project-key-version+1) and use pks-project-key-version to compute a transformation key and new ciphertext $e_k$ (i.e., $e_k$=ENC$_{vpk}$(K'·K$^{-1}$|pks-project-key-version) and a new signature $\sigma_k$ (i.e., $\sigma_k$=sign$_{sk}$($e_k$)). In addition, the PKS 140 may send a message "message (Rotate-VKM, $e_k$, $\sigma_k$)" to the designated client 150 with the new parameters $e_k$, $\sigma_k$.

At step 504, the designated client 150 may forward the message (Rotate-VKM, $e_k$, $\sigma_k$) to the VKM 130.

In the illustrated protocol 310, the VKM 130 may perform step 506 after receiving the message (Rotate-VKM, $e_k$, $\sigma_k$) from the designated client 150. At step 506, the VKM 130 may verify the new signature ak with the PKS's 140 vk key in e.g., an RSA signature verification process. If the signature $\sigma_k$ is not verified, then the protocol 310 terminates.

If the signature $\sigma_k$ is verified, the VKM 130 may decrypt $e_k$ using the VKM's 130 vsk key in e.g., an RSA decryption process to obtain the tuple K'·K$^{-1}$|pks-project-key-version. The VKM 130 may set the key-update-value equal to K'·K$^{-1}$ and vkm-project-key-version equal to pks-project-key-version. The VKM 130 may update the protected keys record with the new project key and version value. That is, for each protected-key $z_j$·K in the record, the VKM 130 stores $z_j$·K' which is equal to $z_j$·K·key-update-value.

As can be appreciated, the disclosed systems and processes provide several advantages over conventional multi-tenant key management services. For example, the disclosed principles use two unique features to reduce memory storage and processing load. The first feature is the use of a short header (e.g., 6 byte header). As is known in the art, a header for ciphertext is mandatory non-secret metadata that is derived together with the key and is used to re-derive the key for decryption of the ciphertext. The header is stored together with each ciphertext and must be short for minimizing storage overhead. In accordance with the disclosed principles, the header is as short as 6 bytes. For example, the header may comprise one or more parameters used from the keyed hash function as well as some data from the client or VKM. Other key management services use headers that are at least 256 bytes or more. Considering that there may be millions of pieces of information to encrypt and de-crypt, this 40 fold reduction in the header is a significant reduction in memory and storage resources.

A second unique feature of the disclosed principles is the use of multiplication based derivations. Traditionally, key management services use derivation computations that utilize exponents and exponential processing, which are complex and processor intensive. By using multiplication based derivations, the disclosed principles result in tremendous efficiency improvement per key derivation operation.

As such, the disclosed systems, processes and protocols are an advancement in the key management services, which is necessarily rooted in computer technology. As such, the disclosed principles provide a technological solution to a technological problem by providing enhanced data and network security in a manner that also uses less memory and reduces the load on the processor in comparison to conventional key management services.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method, comprising:
   receiving, from a first remote server, a client key over a network connection;
   generating a derivation input using the client key and by hashing derivation data;
   transmitting the derivation input to a second remote server;
   receiving, from the second remote server, a blinded derived key generated by the second remote server using a root key and the derivation input;
   unblinding the blinded derived key to generate a derived key; and
   using the derived key to encrypt or decrypt data.

2. The computer implemented method of claim 1, further comprising:
   requesting a client key identifier corresponding to the client key from a key management service in response to determining that the client key identifier not cached.

3. The computer implemented method of claim 2, wherein generating the derivation input comprises:
   generating the derivation input using the client key, the client key identifier, and the hashed derivation data.

4. The computer implemented method of claim 1, wherein receiving the client key over the network connection comprises:
   requesting the client key from the first remote server in response to determining that the client key is not cached.

5. The computer implemented method of claim 1, further comprising:
   generating the derivation data from the data to be encrypted.

6. The computer implemented method of claim 1, the client key being based on a first project key, the method further comprising:
   receiving, from the first remote server, a second client key based on the second project key in response to a rekeying process to generate a second project key.

7. The computer implemented method of claim 1, wherein receiving the client key over the network connection comprises:
   receiving, from the first remote server, a shared client key over the network connection, the shared client key being used by a plurality of clients for a project.

8. A computer implemented method, comprising:
   receiving, from a remote server, a client key over a network connection;
   generating a derivation input using the client key and by hashing derivation data;
   transmitting the derivation input to a second remote server;
   receiving, from the remote server, a blinded derived key generated by the second remote server using a root key and the derivation input;
   unblinding the blinded derived key to generate a derived key; and
   using the derived key to encrypt or decrypt data.

9. The computer implemented method of claim 8, further comprising:
   requesting a client key identifier corresponding to the client key from a key management service in response to determining that the client key identifier is not cached.

10. The computer implemented method of claim 9, wherein generating the derivation input comprises:
    generating the derivation input using the client key, the client key identifier, and the hashed derivation data.

11. The computer implemented method of claim 8, wherein receiving the client key over the network connection comprises:
    requesting the client key from the remote server in response to determining that the client key is not cached.

12. The computer implemented method of claim 8, further comprising:
    generating the derivation data from the data to be encrypted.

13. The computer implemented method of claim 8, the client key being based on a first project key, the method further comprising:
    receiving, from the remote server, a second client key based on the second project key in response to a rekeying process to generate a second project key.

14. The computer implemented method of claim 8, wherein receiving the client key over the network connection comprises:
    receiving, from the remote server, a shared client key over the network connection, the shared client key being used by a plurality of clients for a project.

15. A system comprising:
- a non-transitory storage medium storing computer program instructions; and
- a processor configured to execute the computer program instructions to cause operations comprising:

receiving, from a first remote server, a client key over a network connection;
- generating a derivation input using the client key and by hashing derivation data;
- transmitting the derivation input to a second remote server;
- receiving, from the second remote server, a blinded derived key generated by the second remote server using a root key and the derivation input;
- unblinding the blinded derived key to generate a derived key; and
- using the derived key to encrypt or decrypt data.

16. The system of claim 15, the operations further comprising:
- requesting a client key identifier corresponding to the client key from a key management service in response to determining that a client key identifier is not cached.

17. The system of claim 16, wherein generating the derivation input comprises:
- generating the derivation input using the client key, the client key identifier, and the hashed derivation data.

18. The system of claim 15, wherein receiving the client key over the network connection comprises:
- requesting the client key from the first remote server in response to determining that the client key is not cached.

19. The system of claim 15, the operations further comprising:
- generating the derivation data from the data to be encrypted.

20. The system of claim 15, the client key being based on a first project key, the operations further comprising:
- receiving, from the first remote server, a second client key based on the second project key in response to a rekeying process to generate a second project key.

* * * * *